FIP8102 XR 3,771,059

United States Patent [19]

Butler et al.

[11] 3,771,059

[45] Nov. 6, 1973

[54] UNIVERSAL DATA QUALITY MONITOR

[75] Inventors: Jaquith Gould Butler; Alfred Mack, both of Cherry Hill, N.J.

[73] Assignee: RCA Corporation, New York, N.Y.

[22] Filed: Mar. 27, 1972

[21] Appl. No.: 238,165

[52] U.S. Cl. .................... 325/31, 178/88, 325/65, 325/67, 325/363, 325/364, 325/476, 328/162

[51] Int. Cl. .................... H04b 1/00

[58] Field of Search .................... 178/88; 179/15 BM, 179/15 BV; 325/30, 31, 39, 65, 363, 320, 323, 324, 331, 473–476, 67, 364; 328/162

[56] References Cited

UNITED STATES PATENTS

| | | | |
|---|---|---|---|
| 3,415,947 | 12/1968 | Abbey et al. | 325/31 |
| 3,593,275 | 7/1971 | Pumpe | 325/31 |
| 3,407,355 | 10/1968 | Clark et al. | 325/363 |
| 3,083,337 | 3/1963 | Grimes | 325/331 |

*Primary Examiner*—Albert J. Mayer
*Attorney*—Edward J. Norton et al.

[57] ABSTRACT

A universal data quality monitor selectively samples any of a plurality of differently modulated signals, each of which may have any of a plurality of different data rates, for monitoring the amount of jitter in the sampled signal.

14 Claims, 4 Drawing Figures

| REPRESENTATIVE DATA TRANSMISSION SYMBOL RATES | | | | | |
|---|---|---|---|---|---|
| BIT RATE | MODULATION LEVELS | | | SYMBOL RATE (PER SECOND) | SYMBOL DURATION (MILLISECS.) |
| | PSK | FSK | VSB | | |
| 600 | 2 | 2 | 2 | 600 | 1.6 ms |
| 1200 | 2 | 2 | 2 | 1200 | .83 ms |
| | | | | | |
| 2400 | 2 | 2 | 2 | 2400 | .417 ms |
| | 4 | | 4 | 1200 | .83 ms |
| 3000 | 4 | | 4 | 1500 | .66 ms |
| | | | 2 | 3000 | .33 ms |
| 3600 | 4 | | 4 | 1800 | .55 ms |
| 4800 | 8 | | | 1600 | .625 ms |
| | | | 4 | 2400 | .417 ms |
| | | | | | |
| 9600 | | | 16 | 2400 | .417 ms |

UNIVERSAL DATA QUALITY MONITOR

BACKGROUND OF THE INVENTION

This invention relates to communications apparatus and more particularly to apparatus for monitoring the performance of any of a plurality of data transmission channels.

There has developed in recent years data communication systems wherein a plurality of subscribers are each independently coupled in and out of the respective systems. The respective users may require different data modulation techniques having different data rates. The diversity of modulation techniques includes any of the following which are exemplary: 1,200 bps FSK, 2,200 bps PSK 4 phase, 2,400 bps PSK 4 phase, 2,400 bps PSK-am 4 phase, 4,400 bps PSK 8 phase, 4,800 bps PSK 8 phase, 4,800 bps VSB 4 level, or 9,600 bps VSB. Each of these different modulation techniques and frequencies are assigned to a subscriber in accordance with his transmission requirements.

It is most desirable that the transmission of data over each subscriber's line be accomplished with maximum speed and efficiency with a minimum of error. However, conventional transmission systems are subject to a wide range of transmission distortions. Errors in transmission are usually detected after they have occurred which necessitates repetition of the message, wasting time and channel capacity.

It would be more desirable to monitor each subscriber's line during transmission and to correct system degradation prior to the occurrence of error. To do this with present monitor techniques requires a multiplicity of modems to match the user's data modem types which is both slow and inefficient, adding to the subscriber's costs.

SUMMARY OF THE INVENTION

In accordance with the present invention an apparatus is provided for monitoring the amount of jitter in the actual occurrence of shifts in value of a predetermined parameter in any selected one of a plurality of differently modulated signals whose predetermined parameter shifts in value in successive different nominal times of occurrence manifested by the individual standard signal corresponding to the selected signal. The apparatus includes means responsive to the selected modulated signal applied thereto for deriving as an output therefrom a timing signal manifesting the time of occurrence of actual shifts in value of the predetermined parameter of the selected signal, the jitter causing the time of occurrence of the actual shifts in value to vary from the nominal times of occurrence. The apparatus further includes jitter-indicating means having the timing signal and a given individual standard signal corresponding to the modulated signal then being monitored applied as respective inputs thereto for comparing the timing signal to generate a jitter indicating signal when the time of occurrence of any timing signal differs from that of the given individual standard signal.

DESCRIPTION OF THE PREFERRED EMBODIMENT

Figure 1:
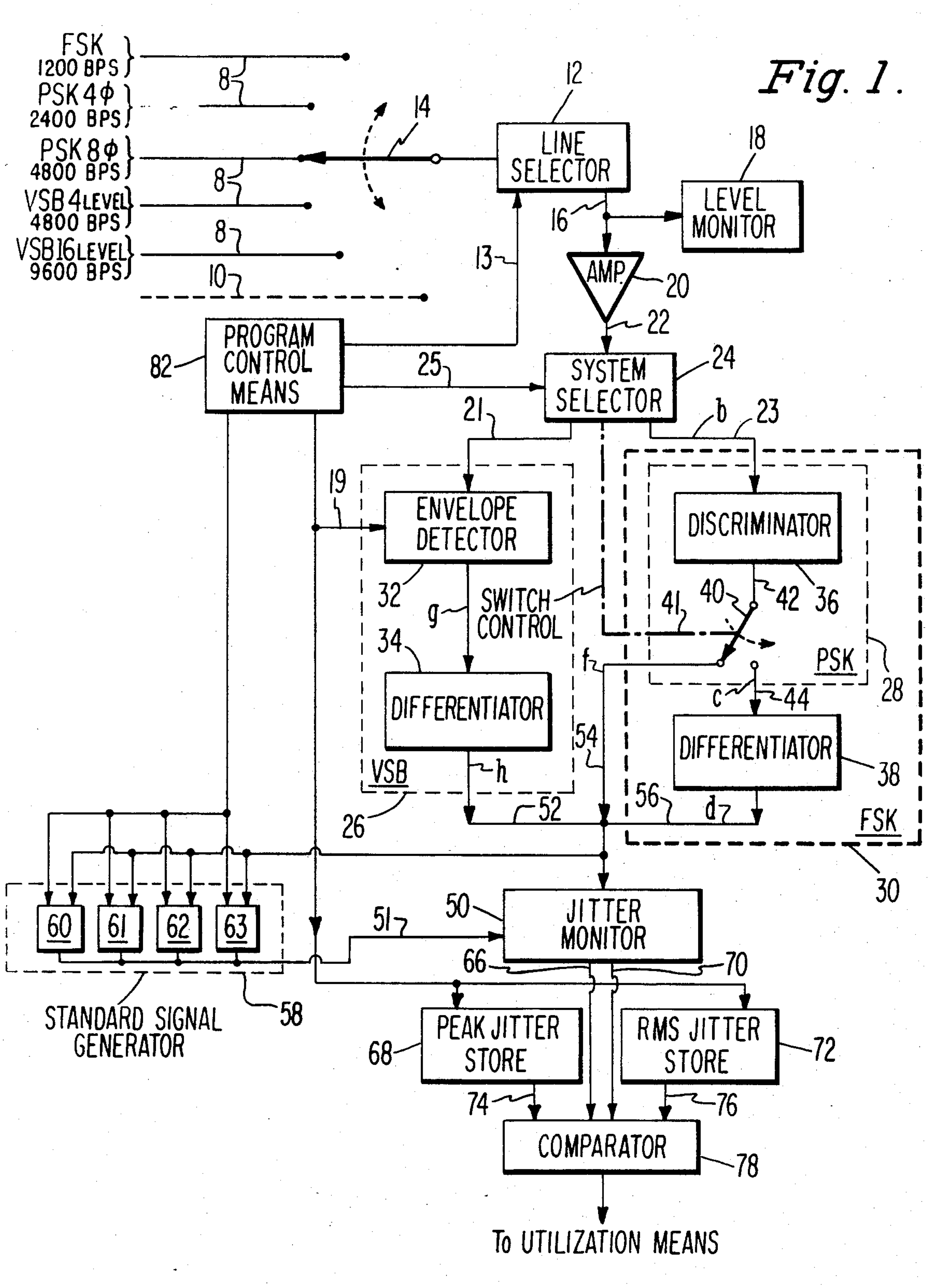
FIG. 1 is a diagrammatical illustration of an apparatus in accordance with the present invention.

The term distortion as used herein means that a change has occurred in a transmitted signal when received as compared to that transmitted. Signals may be distorted in amplitude, duration and in times of occurrence of shifts in value of a respective signal parameter. Thus, in a waveform comprising a sequence of rectangular pulses, the shape of the pulses may be distorted during transmission, shifting the relative time of occurrence of the transitions forming pulses when the pulses are restored to the rectangular form at a receiver. Time distortion of signal elements may be fortuitous or systematic. Fortuitous distortion resulting from randomly occurring conditions are not repetitive whereas systematic distortions are those which occur with predictable repetition. Systematic distortion can be further defined as including bias and characteristic distortion. By bias distortion is meant that distortion which occurs as a function of the polarity of the waveform. That is, as an example, for a rectangular waveform, the time duration of the waveform will be always shorter than nominal for positive excursions and always greater than nominal for negative excursions.

By characteristic distortion is meant that distortion which continues to occur uniformly in time regardless of the polarity and amplitude of the transmitted signal. That is, in a rectangular waveform, the time duration of the waveform which is either greater than nominal or less than nominal continues to be so regardless of the polarity of the waveform so that the transitions of the waveform for a short duration waveform occur prematurely in increasing increments and late in increasing increments for waveforms that are longer than nominal. Bias and characteristic distortion effects will be included in the term hereinafter referred to as "jitter." The term jitter as used herein refers to time deviations from the nominal in actual shifts in value of a signal parameter whether that parameter be the envelope, phase or frequency of a signal. Since every transmission system can tolerate some distortion and it is only when the distortion exceeds the tolerance level of the system that error is introduced, it is advantageous to detect the amount of distortion in the no error condition in a given transmission system. It can be demonstrated that detection of the amount of jitter in a transmitted signal when equated to a threshold level corresponds to predictable error in the transmission system. Therefore, by monitoring the amount of jitter in a transmission system the quality of the system can be measured, identified and corrective action taken prior to the occurrence of excessive errors for a particular application.

The apparatus in accordance with the present invention is provided to monitor the magnitude of the jitter in any one of a plurality of differently modulated signals processed by the transmission system. By suitably providing detection means capable of analyzing the amount of jitter as equated to a threshold level, steps can be taken to correct the cause of the excess jitter prior to error occurring at the received end of a subscriber's transmitted message.

In FIG. 1 each transmission line 8 and dotted line 10, manifesting a plurality of lines, represents a different data transmission channel at the sampling or monitoring location. The transmission link interconnecting a receiving station with a transmitting station will vary for each subscriber or, for that matter, for the same subscriber in transmission line length, characteristics and so forth in accordance with the arrangement established for a particular transmission as would occur in conventional telephone links. In an actual interconnecting arrangement as manifested by lines 8 and 10, the sampling location for a given line remains fixed for purposes of monitoring that line.

Additionally, signal modulation and the accompanying data rate for any one signal then being transmitted, in practice, will differ along lines 8 and 10 at any given time and at any one of lines 8 and 10 at different times so that, in essence, only the sampling location remains relatively fixed. While frequency shift keying (FSK), phase shift keying (PSK) and vestigial sideband signals (VSB) are illustrated for certain ones of lines 8, these are only exemplary of the type of signal occurring at a given transmission line sampling point. Thus, whereas an fsk signal at 1,200 bps is shown for one of lines 8, this same sampling location may exhibit a signal that is differently modulated at a different data rate. However, regardless of type of modulation or data rate that may be present in any signal at any sampling location at any time, the universal monitor of the present invention is provided this a priori information for monitoring the quality of any or all of those signals.

Suitable line selector 12 in response to a line select signal applied at input 13 causes scanner 14 to selectively couple one of lines 8 and 10 to output 16. For simplicity of illustration, scanner 14 is shown as a rotating contact which sequentially couples each of lines 8 and 10 to output 16. However, it is to be understood, that any or all of lines 8 and 10 are scanned in any given order by scanner 14. For example, line selector 12 and scanner 14 may be a bank of switches which in response to the line select signal at input 13, causes certain selected ones of the switches to close in a predetermined order to selectively and conductively couple lines 8 and 10 to output 16.

Output 16 of line selector 12 is coupled to level monitor 18 and amplifier 20. Monitor 18 is a suitable apparatus provided for monitoring the amplitude level of the sampled signal. The amplified sampled signal is applied via input 22 to system selector 24 which selectively couples input 22 to either of outputs 21 or 23. At the same time output 23 is selected, system selector 24 controls the switch position of switch 40 via line 41. Selector 24 may be a second bank of switches whose switch positions are determined by a system select signal applied at input 25. By selectively coupling input 22 to output 21 or 23 and controlling the switch position of switch 40 in response to the applied system select signal, system selector 24 selects one of a given plurality of signal processing systems to be described for deriving a timing signal from the sampled signal. This timing signal manifests the time of occurrence of digital symbol transitions represented by actual shifts in value of the information bearing parameter of the sampled signal. In accordance with the present invention, the information bearing parameter includes, frequency in a frequency shift keyed signal, phase in a phase shift keyed signal, and the envelope of a vestigial side band signal. This information bearing parameter between successive transitions will hereinafter be referred to as a symbol.

In FIG. 1, the signal processing systems or timing signal deriving means include vestigial sideband (vsb) system 26, phase shift keying (psk) system 28 and frequency shift keying (fsk) system 30. System 26 includes carrier recovery and exalter carrier envelope detector 32 and differentiator 34 for deriving as an output therefrom at output 52 a timing signal manifesting the time of occurrence of digital symbol transitions represented by the actual times of occurrence of shifts in amplitude of the envelope of the sampled signal applied thereto at system selector output 21, the sampled signal being of the vestigial sideband reduced carrier type. Detector 32 includes a programable tuneable filter provided for obtaining carrier recovery. The filter is tuned by way of a control signal at input lead 19. Detector 32 is well known and no further description will be given.

System 28 includes discriminator 36 with switch 40 connected to system output 54 for deriving as an output therefrom a timing signal manifesting the time of occurrence of digital symbol transitions is represented by the actual times of occurrence of shifts in phase of the sampled signal applied at system selector output 23, the sampled signal being of the phase shift keyed type.

System 30 includes discriminator 36 and differentiator 38 with switch 40 connected to input 44 of differentiator 38 for deriving as an output therefrom at output 56 a timing signal manifesting the time of occurrence of digital symbol transitions represented by the actual times of occurrence of shifts in frequency of the sampled signal applied at system selector output 23, the sampled signal being of the frequency shift keyed type.

The respective outputs 52, 54 and 56 of systems 26, 28 and 30 are applied to jitter monitor 50 as is output 51 of standard signal generator 58. Monitor 50 is a suitable device which serves to provide peak and rms signals at outputs 66 and 70, respectively, which signals manifest the amount of peak and rms jitter in the derived timing signal then being applied to monitor 50 via outputs 52, 54 or 56 as will be explained. Standard signal generator 58 includes a plurality of saw-tooth wave generators 60–63 inclusive, representing the range of separate, discrete permissible symbol rates which are separately selected as also will be explained. Each of outputs 52, 54 and 56 are applied as inputs to generators 60–63.

Respective peak and rms jitter outputs 66 and 70 of monitor 50 are applied as inputs to comparator 78. outputs 74 and 76 of peak jitter store 68 and rms jitter store 72, respectively, are also applied as inputs to comparator 78. Peak jitter store 68 and rms jitter store 72 are suitable devices for storing reference signals respectively manifesting the peak and rms jitter threshold limits for the timing signal then being derived for comparison by comparator 78. When the monitored peak and rms jitter signals provided by monitor 50 at respective outputs 66 and 70 exceed the threshold value of the reference signals provided by respective stores 68 and 72, comparator 78 provides a jitter indicating signal at the output of comparator 78. This jitter indicating signal is applied to utilization means (not shown) for indicating the presence of excessive jitter in the signal then being sampled.

Program control means 82 provides control signals to line selector 12 and system selector 24 via inputs 13 and 25, respectively. In addition, means 82 provides a control signal to peak jitter threshold store 68, rms jitter store 72, envelope detector 32 and to each of generators 60-63 for selecting the applicable standard signal. Program control means 82 serves to start and stop the operation of the entire system comprising the data quality monitor of the present invention and to synchronize the operation of line selector 12, system selector 24, detector 32, jitter stores 68 and 72 and standard signal generator 58.

While the operation of the several components illustrated in FIG. 1 will become apparent to those skilled in the art upon becoming familiar with the description of operation set forth below, the following brief descriptions may prove helpful for a complete understanding of the invention. The signal applied to interval jitter monitor 50 from outputs 52, 54 or 56 is a timing signal that is derived from the data transmission signal then being sampled from transmission lines 8.

Figure 2:
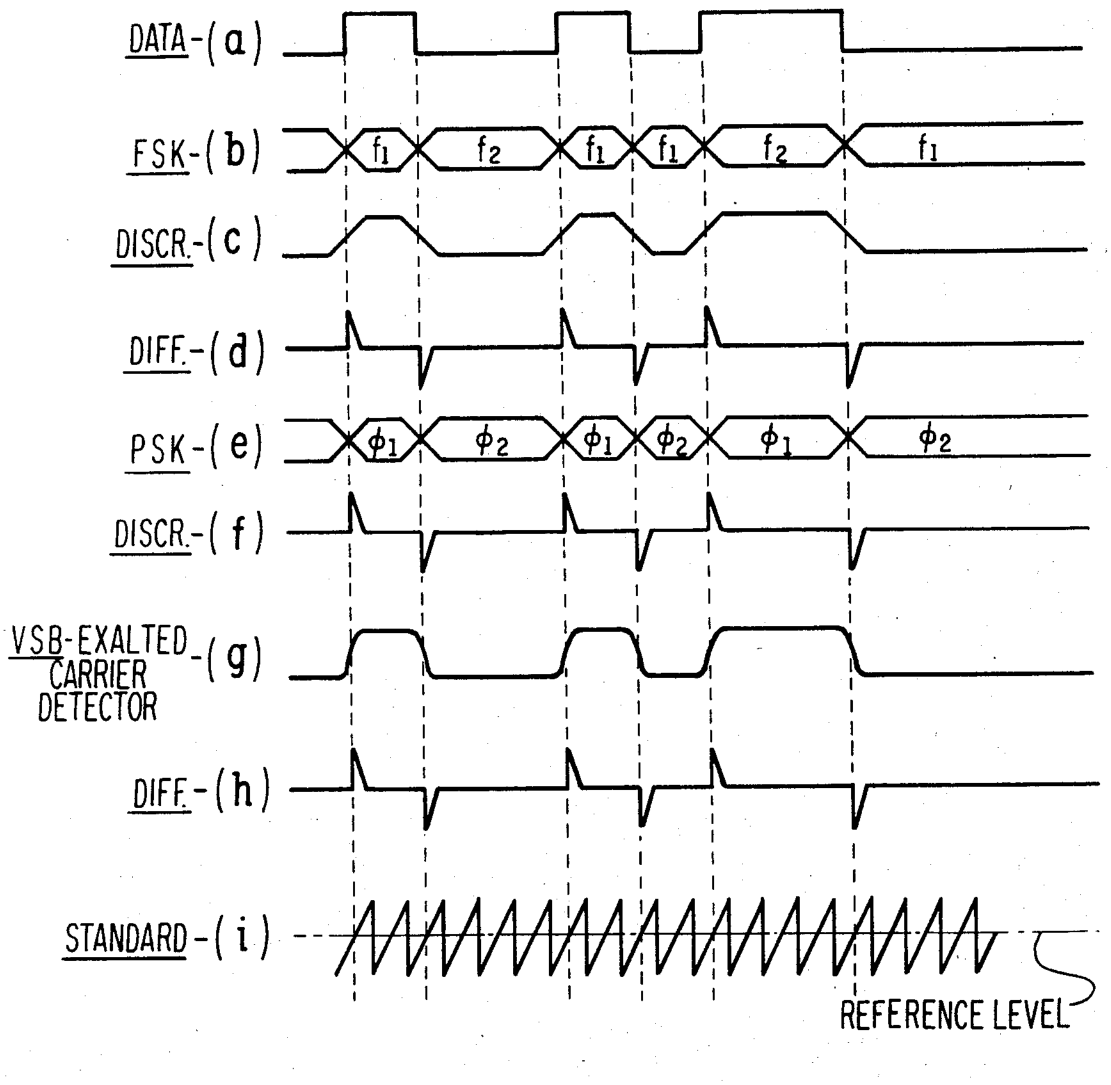
FIGS. 2 and 3 are illustrations of waveforms useful in explaining the preferred embodiment of the present invention.

Each of systems 26, 28 and 30 derive a timing signal manifesting the actual time of occurrence of digital symbol transitions in a data signal such as waveform (a), FIG. 2 from the corresponding respective sampled signal having an information bearing parameter thereof which shifts in value as illustrated by waveforms (b), (e) and (g) of FIG. 2.

System 30 is provided to derive waveform (d) from a frequency shift keyed signal then being sampled. Discriminator 36, as described above, provides a signal that shifts in level when the input signal applied thereto shifts in frequency. Thus when a frequency shift key signal, as illustrated by waveform (b), is applied to discriminator 36, a signal applied at output 42 of the discriminator will appear as waveform (c). Program control means 82 switches the switch position of switch 40 so that it is coupled to input 44 of differentiator 38 when an fsk transmission line is sampled.

Discriminator 36 of system 28 is a device which takes the time derivative of the applied angle modulated data signal. The envelope of the derivative at output 42 is, thus, a signal which shifts in amplitude as a function of the digital modulation. When a phase shift keyed signal, as illustrated by the waveform (e) of FIG. 2, is applied to discriminator 36, the derivative of each shift in phase between phase one ($\phi_1$) and phase two ($\phi_2$) provides derived symbol transition pulses, waveform (f), at the output of discriminator 36.

The symbol transition (waveform (f)) are applied to output 54 via switch 40 whose switch position is controlled by program contro means 82. While the symbol repetition rate represented by the repetition rate of the phase shifts of waveform (e) may be different for different subscriber lines, the rate for any given subscriber line is known a priori. This a priori knowledge is also true for vsb signals and the fsk signals.

With respect to system 26, the parameter being monitored is the amplitude of the envelope of the vestigial side band signal. Thus, exhaulted carrier envelope detector 32 detects the shifts in amplitude of carrier waveform (g) of FIG. 2. It is apparent that differentiation of waveform (g) will provide pulses as illustrated by waveform (h) at each of the transitions of waveform (g). The transitions of waveform (g) are known to occur at the data symbol repetition rate for each vestigial sideband signal being transmitted. Thus, the derived pulses, waveform (h) manifest the actual times of occurrence of shifts in amplitude of the envelope and should occur at a known nominal symbol repetition rate for a given data rate. For example, 9,600 bps data repetition rate via 16 level vsb signal will have a symbol repetition rate of 2,400 symbols per second. As is now apparent, the actual times of occurrence of the derived transition pulses of each of the differently modulated signals can be compared to a reference standard signal manifesting the nominal times of occurrence of those transitions, and the difference between these times of occurrence serving as a jitter indicating signal. The times of occurrence of the derived symbol transition pulses of waveforms (d), (f) or (h) are caused to vary from their nominal positions by channel distortion and noise effects and terminal equipment misalignment. Systematic channel caused peak time deviations, or peak jitter, is an effect of residual differential delay distortion in the channels. Representative values for allowable peak jitter due to such channel distortion is ± 10 to 15 percent of symbol time duration. Fortuitous peak jitter is an effect of such phenomena as random noise, impulse noise, and transitory signal drop outs from poor cable solder joints. Representative values allowable for fortuitous peak jitter generally range from ± 20 to 45 percent of symbol time duration. Prescribed channel transfer function specifications for conventional transmission lines will generally place an upper limit on the number of fortuitous peak jitter occurrences for a given interval of time.

Conventional terminal equipment (input devices and modems) misalignments will generally cause all symbol transition displacements to have the same sense, ie, either all transitions will occur early, or all transitions will occur late with respect to the nominal times of occurrence. Such terminal misalignment effects are relatively consistent for the rms time jitter. Prescribed terminal equipment generally has rms time jitter values of less than 10 percent of symbol time duration. On line measurements of peak and rms jitter according to the present invention, will detect jitter degradations and deviations from the prescribed channel transfer function jitter specifications and from the prescribed conventional terminal equipment alignment jitter specifications. Data quality monitor constraints on jitter resolution are a function of symbol transition detection responses to bandwidth limited M-ary modulated modem signals. By utilizing a combination of peak and energy levels of the derived pulses of waveforms (d), (f) and (h), for monitoring the derived timing signals jitter, jitter monitor 50 resolves actual jitter in a sampled signal to an extent exceeding the prescribed channel and terminal equipment jitter specifications described.

Figures 3, 4:
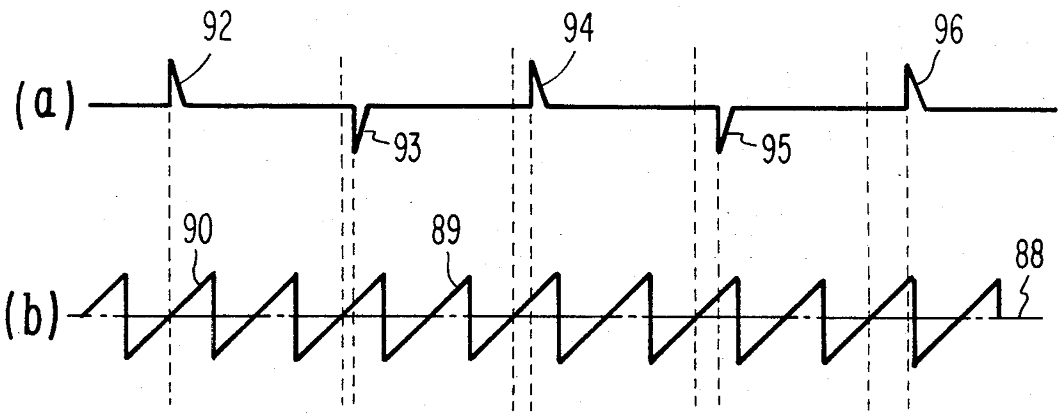
FIG. 4 is a table of representative symbol rates and bits per second combination.

While the waveforms of FIG. 2 are shown having the same symbol repetition rate with one bit per symbol, it is to be understood that this is provided merely for purposes of simplicity of illustration, and that in practice the symbol repetition rates and bits per symbol for each of waveforms (b), (e) and (g) may differ among themselves and for different transmission lines which may have different data rates. However, regardless of the many different possible symbol repetition rates and bits per symbol combinations that may be present, standardization of data rates is generally provided in a relatively few given multiples such that symbol rate and bits per second combinations for all known possible subscribers' signals can be defined. Representative symbol rate, bits per second combinations are shown in FIG. 4. Thus at outputs 52, 54, and 56 of the particular selected systems 26, 28 or 30, respectively, there is always a derived timing signal whose sequence of symbol transition pulses have a known symbol repetition rate.

Standard signal generator 58 serves to provide a standard signal manifesting the symbol rate of the data signal then being sampled in response to a derived timing signal and a control signal. For example, the five data signals illustrated for transmission lines 8 are represented by symbol rates of 1,200, 1,200, 1,600, 2,400 and 2,400 symbols per second, respectively. The three different symbol rates correspond to three of the four sawtooth wave generators 60, 61, 62 and 63, each of which provide a waveform such as that shown by waveform (i) of FIG. 2.

The fundamental frequency of each of the sawtooth generators 60–63, respectively correspond to a different one of the fundamental frequencies of the timing signals derived from the different data rate signals then being sampled. Thus, for example, generator 60 corresponds to a 1200 symbol per second data signal, generator 61 corresponds to a 1,500 symbol per second data signal, generator 62 corresponds to a 1,600 symbol per second data signal and generator 63 corresponds to a 2,400 symbol per second data signal. While a sawtooth wave generator is described, it is to be understood that a waveform provided by interval standard signal generator 58 may also be of any convenient suitable wave shape for purposes to be described.

Jitter monitor 50 serves to compare the time of occurrence of the symbol transitions as manifested by the timing signals provided at outputs 52, 54 and 56 with the interval standard signals provided by generator 58. Monitor 50 measures the difference between the actual time of occurrence of successive symbol transition of waveforms (d), (f) and (h) with respect to the nominal times of occurrence as manifested by the corresponding time base waveform provided by generator 58. The measurements are of two types, i.e., the maximum single time deviation from nominal transitions time of occurrence (peak jitter) and rms value of all time deviations during the measurement interval (rms jitter).

Peak jitter store 68 serves to store the maximum tolerable peak jitter value that will still permit satisfactory data transmission service. For example, fifteen to twenty percent peak jitter values is considered a representative range of peak jitter threshold values. The rms jitter store 72 stores the maximum tolerable rms jitter values that will still permit satisfactory data transmission service. Monitor 50 includes suitable circuitry for detecting both the amplitude and energy characteristics of the derived timing pulses of waveforms (d), (f) and (h) for comparison with the waveforms of generator 58.

Comparator 78 compares the peak and rms jitter measurement signals at outputs 66 and 70 of jitter monitor 50 with output 74 of peak jitter store 68 and output 76 of rms jitter store 72, respectively. When either or both of the jitter measurements manifested by signals at outputs 66 and 70 exceed the predetermined maximum limit as manifested by the stored threshold values, a signal is provided at the output of comparator 78 to suitable utilization means which indicate that the quality of the sampled lines has exceeded its threshold level, permitting suitable corrective action to be taken (by means not shown) prior to the occurrence of data service interruption by excessive error rates. Such utilization means may include a conventional stored program processor which provides readouts, displays or any other suitable output devices such as an alarm or the like.

Program control means 82 is a stored program computer or similar apparatus which coordinates and precisely controls the functions of the data quality monitor. The signals applied by means 82 to line selector 12 and system selector 24 serves to respectively operate scanning device 14 to sample a particular subscriber line 8 or 10 while at the same time causing the system selector 24 to select that one of systems 26, 28 or 30 which corresponds to the line then being sampled. At the same time, the signal applied to standard signal generator 58 causes a standard signal generated by generator 58 to commence in synchronism with the timing symbol transition signal applied to jitter monitor 50. The timing of the standard signal coincides with the first occurring derived symbol transition pulse in a manner to be described.

A signal is applied by means 82 to suitable jitter stores 68 and 72 at the same time as the other control signals of means 82 are generated to switch the stored threshold values in stores 68 and 72 at outputs 74 and 76 at the end of a given sampling run of each line to correspond to the next sampled signal and to switch the jitter measurement signals applied by jitter monitor 50 to comparator 78, together with the corresponding separate store signals assigned to the transmission line then being sampled, the separate reference store signals each provided by suitable means in stores 68 and 72.

The operation of the monitor of FIG. 1 will now be described. Each of a plurality of subscribers' transmission lines 8 are sampled at a convenient suitable location in the line at a central processing station. These transmission lines, from day to day, and in some instances, from hour to hour, may vary as to the type of signals being carried thereon as well as the data rate thereon. Each of these lines is assigned a sampling sequence which is programmed into control means 82 in a convenient manner. At any given time, program control means 82 is provided, according to the present invention, a priori information as to the modulation technique and the data rate of any signal on any given transmission line 8 and 10. Thus, when control means 82 causes line selector 12 to sample a transmission line, the data rate and modulation technique of the sampled signal are known.

Program control means 82 causes line selector 12 to sequentially sample each of the transmission lines in either a continuous or intermittent operation whichever is suitable for a particular application. At the same time, means 82 causes the system selector to operate in synchronism with line selector 12 to select that system 26, 28 or 30, as the case may be, which corresponds to the sampled signal. The sampled signal is applied to scanner 14 through line selector 12 along output 16 to level monitor 18, is amplified by amplifier 20, and applied along lead 22 to system selector 24.

The selected signal is then applied to the corresponding respective system 26, 28 or 30 by system selector 24 in accordance with the control signal received from means 82. Derived timing signals at outputs 52, 54 and 56, respectively applied to jitter monitor 50 are also applied to standard signal generator 58 to cause an appropriate corresponding standard signal to be generated upon receipt of a command thereof by program control means 82.

Upon receipt of this command standard signal generator 58 is caused to generate from one of sawtooth generators 60–63 a standard signal whose periodic time base corresponds to the data symbol rate than being monitored. For example, in FIG. 3, waveform (a) manifests the timing signal derived from a data signal then being sampled. Waveform (b) is a standard signal generated, for example, by one of a sawtoothed generators 60–63. Line 88 of waveform (b) represents the reference level of the sawtooth wave 89 which will provide jitter indication for the times of occurrence of the pulses of waveform (a). Thus, a shift to the right of the intersection of line 88 along the slope of each of the pulses of waveform 89 provides a positive voltage while a shift to the left of that intersection provides a relatively negative voltage. The amplitude of that voltage is calibrated to manifest the amount of jitter in the sampled signal. This voltage is provided by conventional techniques in monitor 50.

Upon receipt of a command signal from program control means 82 and the derived timing signal by standard signal generator 58, one of the sawtoothed generators 60 through 63 is responsive to those signals for generating a waveform 89 such that the waveform transition through reference level 88 by a given sawtooth pulse such as pulse 90 substantially coincides with the first occurrence of a derived timing or symbol transition pulse 92 applied to the input of monitor 50. That is, the pulses of the derived signals start the running of the clock as manifested by generator 58. Subsequently, each derived symbol transition pulse 93 through 96 will be displaced in time from the sawtooth wave reference level transitions due to channel transfer function distortion and terminal equipment misalignment as applicable.

During each measurement or sampling interval, (10 seconds would be a representative interval), the voltages representing peak and rms symbol transition displacements are derived and applied to comparator 78 at the termination of that interval. Concurrently, the voltages representing the applicable jitter thresholds are also applied to the comparator from jitter threshold stores 68 and 72. The comparator then provides an indication to suitable utilization means as to whether the jitter measurements for that particular interval are below or above the threshold values.

Thus there has been shown in accordance with the present invention, an apparatus for automatically monitoring the reliability of data communication systems for evaluating the quality of the lines for each signal being transmitted regardless of the type of modulation or data rate. This permits real time monitoring of operational signals for providing continued reliability measurements of on line transmission networks with automatic scanning and sequential sampling being provided for selected subscribers.

What is claimed is:

1. An apparatus for monitoring the amount of jitter in the actual occurrence of shifts in value of a predetermined modulation parameter corresponding to that selected one of a plurality of differently modulated signals each of whose predetermined modulation parameter shifts in value in successive different nominal times of occurrence manifested by an individual standard signal corresponding to said selected one modulated signal, said apparatus comprising:

standard signal generating means for generating said individual standard signal, means responsive to said one selected modulated signal applied thereto for deriving from said selected one signal as an output therefrom a timing signal representing the time of occurrence of actual shifts in value of said predetermined modulation parameter of the selected one signal, said jitter causing the time of occurrence of said actual shifts in value to vary from said nominal time of occurrence, and jitter signal generating means including comparison means having said timing signal and said given individual standard signal applied as respective inputs thereto for comparing said timing signal to said individual standard signal to generate a jitter signal representing the difference between the time of occurrence of said timing signal and said individual standard signal.

2. The apparatus of claim 1 wherein said predetermined parameter is frequency.

3. The apparatus of claim 1 wherein said predetermined parameter is phase.

4. The apparatus of claim 1 wherein said predetermined parameter is the envelope of a vestigial sideband signal.

5. The apparatus of claim 1 further including means coupled to said deriving means for selectively sampling said one modulated signal and for applying said one signal to said deriving means.

6. The apparatus of claim 5 wherein said selective sampling means includes means for selectively applying said given individual signal to said jitter signal generating means.

7. An apparatus for monitoring the amount of jitter in the actual occurrence of shifts in value of a predetermined modulation parameter corresponding to that selected one of a plurality of differently modulated signals each of whose predetermined modulation parameter shifts in value in successive different nominal times of occurrence manifested by an individual standard signal corresponding to said selected one modulated signal, said apparatus comprising:

a plurality of timing signal deriving means, each being responsive to a different modulation parameter corresponding to said selected one signal applied thereto for deriving as an output therefrom a timing signal representing the time of occurrence of actual shifts in value of said corresponding predetermined modulation parameter, the modulated signals applied to a given one of said deriving means each having the same predetermined modulation parameter different from the modulation parameter of the modulated signals applied to the other of said deriving means, said jitter causing the time of occurrence of said actual shifts in value to vary from said nominal times of occurrence, means for selectively providing said individual standard signal, means for selecting that deriving means corresponding to the modulation parameter of said one modulated signal then being monitored, and jitter signal generating means including comparison means having said timing signal and said selectively provided standard signal applied as inputs thereto for comparing said timing signal to said individual standard signal to generate a jitter signal representing the difference between the time of occurrence of said timing signal and said individual standard signal.

8. The apparatus of claim 7 wherein said predetermined parameter is frequency or phase.

9. The apparatus of claim 7 wherein said predetermined parameter is frequency or the envelope of a vestigial sideband signal.

10. The apparatus of claim 7 wherein said predetermined parameter is phase or the envelope of a vestigial sideband.

11. An apparatus for monitoring the amount of jitter in a plurality of differently modulated signals, comprising:

first means for deriving as an output therefrom a timing signal representing the actual time of occurrence of successive shifts in value of a predetermined modulation parameter of a first modulated signal, second means for deriving as an output therefrom a timing signal representing the actual time of occurrence of successive shifts in value of a predetermined modulation parameter of a second signal differently modulated than said first signal, third means for deriving as an output therefrom a timing signal representing the actual time of occurrence of successive shifts in value of a predetermined modulation parameter of a third signal differently modulated than said first and second signals, fourth means for providing a plurality of standard signals each representing nominal times of occurrence of successive shifts in value of a corresponding one of said signal modulation parameters, a different standard signal corresponding to a respective different nominal time of occurrence, fifth means for comparing a selected one of said timing signals with a selected standard signal whose nominal times of occurrence correspond to the expected actual times of occurrence of the shifts in value of the selected timing signal applied as respective inputs thereto, said fifth means including means for comparing said times of occurrence over a given time interval and for providing a jitter signal representing said amount of jitter when said actual times of occurrence shift from said nominal time of occurrence, and sixth means including control means for selectively applying one of said timing signals and the standard signal corresponding to said one timing signal to said fifth means.

12. The apparatus of claim 11 wherein said first modulated signal parameter is frequency and said first means includes a discriminator whose output is applied as an input to a differentiator whose output is applied as said timing signal input to said fifth means.

13. The apparatus of claim 11 wherein said second modulated signal parameter is phase and said second means includes a discriminator whose output is applied as said timing signal input to said fifth means.

14. The apparatus of claim 11 wherein said third modulated signal parameter is the envelope of a vestigial side band signal and said third means includes an envelope detector whose output is applied as an input to a differentiator whose output is applied as said timing signal input to said fifth means.

* * * * *